United States Patent

Clausse

[15] 3,662,674

[45] May 16, 1972

[54] BEVERAGE MAKING APPARATUS

[72] Inventor: Georges Jean Louis-Marie Clausse, 5 Muncester House, Ferry Lane, Laleham, Middlesex, England

[22] Filed: Oct. 9, 1970

[21] Appl. No.: 79,610

[30] Foreign Application Priority Data

| Oct. 9, 1969 | Great Britain | 49,708/69 |
| Dec. 17, 1969 | Great Britain | 61,560/69 |
| May 5, 1970 | Great Britain | 21,672/70 |
| May 5, 1970 | Great Britain | 21,673/70 |

[52] U.S. Cl. ............................................. 99/283, 99/289
[51] Int. Cl. ............................................. A47j 31/18
[58] Field of Search ............................................. 99/283, 289

[56] References Cited

UNITED STATES PATENTS

| 2,300,300 | 10/1942 | Lund | 99/283 |
| 3,024,718 | 3/1962 | Morrison | 99/283 |
| 3,069,999 | 12/1962 | Morrison | 99/289 |
| 3,280,721 | 10/1966 | Walker | 99/289 |

Primary Examiner—Robert W. Jenkins
Attorney—Wenderoth, Lind & Ponack

[57] ABSTRACT

Beverage making apparatus has a liquid receptacle, means normally positioned to support soluble or infusible matter above liquid in the receptacle, and means for releasing the support means to dispense the matter into the liquid. The release means includes materials which normally are held together by magnetic attraction and which, when the temperature of the body exceeds a predetermined value, separate from one another to release the support means.

23 Claims, 14 Drawing Figures

GEORGES JEAN LOUIS-MARIE CLAUSSE,
Inventor

BY. Wenderoth Lind & Ponack
Attorneys

BEVERAGE MAKING APPARATUS

This invention relates to beverage making apparatus of the kind in which soluble or infusible matter is supported above liquid in a receptacle and is dispersed into the liquid when this liquid reaches a predetermined temperature.

In known apparatus of this kind the dispersing operation was effected under the control of a bi-metallic element. Such arrangements have the disadvantage that they are not easily arranged to operate consistently and reliably and also precisely when the liquid reaches a predetermined temperature. A further disadvantage is that such arrangements are not readily adapted to control the operation of an electric heater and it is usually desired, especially when making tea, that water in the receptacle should stop boiling immediately the tea or other soluble or infusible matter has been dispensed.

The improved beverage making apparatus of this invention comprises a liquid receptacle, means normally positioned to support soluble or infusible matter above liquid in the receptacle, and means for releasing the support means whereby to dispense the matter into the liquid, the release means including a magnet and a body of thermo-magnetic material which normally are held together by magnetic attraction and which, when the temperature of the body exceeds a predetermined value, separate from one another whereby to release the support means.

The expression "thermo-magnetic material" as used herein means a temperature sensitive ferromagnetic material, such for example as certain nickel iron alloys, which is ferromagnetic at temperatures below the Currie point and paramagnetic at temperatures above this point. Such material is thus capable of being attracted by a magnet at temperatures below the Currie point but is scarcely or not at all attracted at temperatures above this point. It has been found that by the selection of an alloy having a suitable Currie point temperature and because of the sudden change in magnetic properties at this temperature, consistent, reliable and accurate control of the operation of a beverage making apparatus can be achieved by the combination of a magnet and a member of such thermomagnetic material.

Some forms of the improved beverage making apparatus of this invention will now be described with reference to the accompanying drawings in which.

Figure 1:
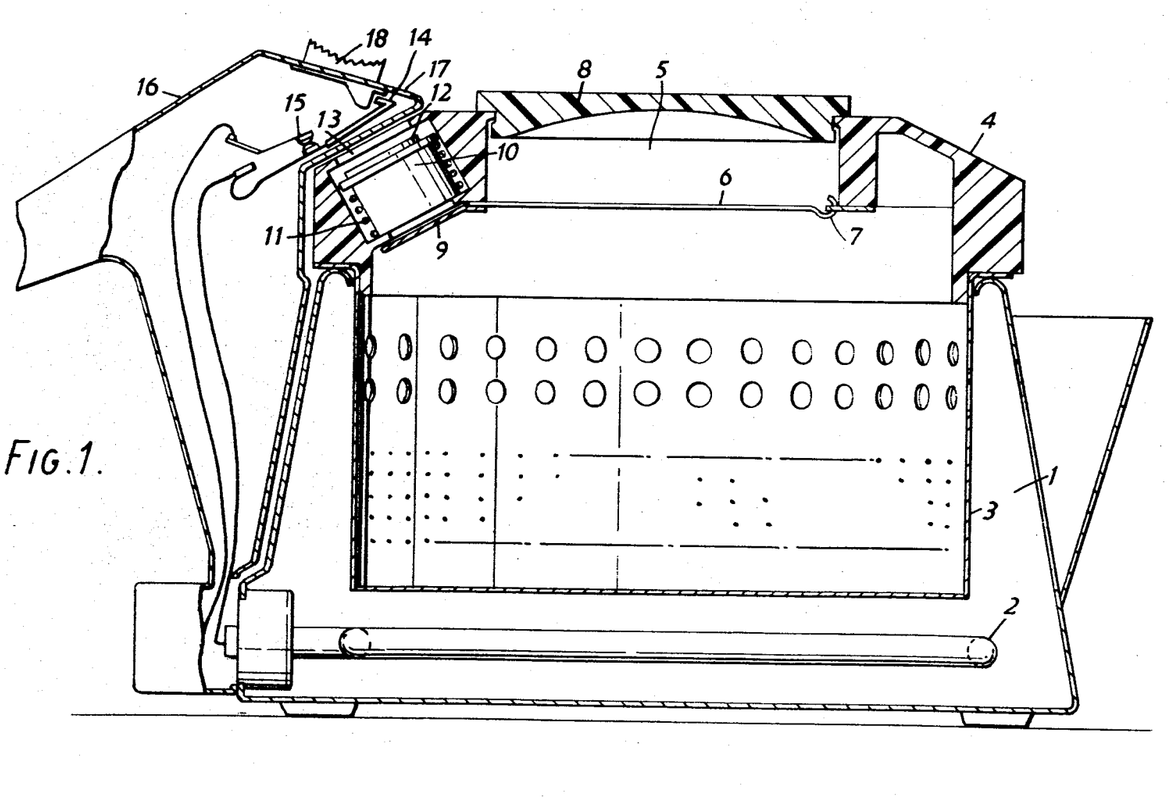
FIG. 1 is a diagrammatic sectional elevation of one form of beverage making apparatus.

FIG. 1 shows a beverage making apparatus having a water compartment 1, an electric heating element 2 in the water compartment, and a perforated container 3. A lid 4 includes a compartment 5 the bottom surface of which is formed by a flap 6 which is pivotally mounted about one edge 7. The compartment 5 is provided with a cover 8.

The flap 6 has an extension 9 on the edge remote from the pivoted edge 7 which is made of a thermo-magnetic material which is ferromagnetic at room temperatures but at higher temperatures is non-magnetic, or at least very much less magnetic. Such materials are commercially available and may consist of a nickel-iron alloy containing about 30 percent nickel.

A magnet 10 is mounted in the lid 4 on a light spring 11. When the extension 9 is in the position shown and at room temperature the magnet 10 attracts the extension 9 thus holding the flap 6 in the horizontal position. When the extension 9 is heated by steam it becomes less magnetic and is no longer held by the magnet 10. Consequently the flap 6 falls emptying the contents of the compartment 5 into the water.

In addition the magnet 10 is no longer attracted by the extension 9 and thus moves upwards under the action of the spring 11. The top 12 of the magnet 10 engages in an aperture 13 in the lid and is arranged to attract a steel plate 14 and pull the latter downwards. Downward movement of the plate 14 breaks contacts 15 thus disconnecting the heater element 2 from the supply.

The contacts 15 are housed in the handle 16 of the apparatus, which may be made of a plastics material. The plate 14 is bent at the top as seen in the figure and when attracted by the magnet 10 the bent portion of the plate comes in front of a transparent window 17 to indicate that the beverage making cycle has finished.

To restart the apparatus, a slider 18 is moved forward to engage the plate 14 and retain the contacts 15 open. The lid 4 is then removed and the flap 6 is pushed back into its horizontal position while at the same time magnet 10 is depressed against the spring 11. The magnet 10 then supports the extension 9 again. The hopper 5 is then refilled with tea, teabags or other infusible matter and the water compartment is filled with fresh water. The lid 4 is then replaced, the magnet 10 being repositioned under the plate 14. When the slider 18 is moved back the heating element 2 is reconnected and heating begins again.

Important features of the apparatus illustrated reside in the use of the thermo-magnetic material in conjunction with a magnet to provide the release mechanism of the tea dispenser, in the use of movement of the magnet resulting from it not longer being held by the extension 9 to open the contacts 15, and the mechanism including the plate 14 by which the contacts are opened by the magnet.

The sudden upwards movement of the magnet 10 ensures positive action in opening the contacts 18, which is necessary in view of the large current flowing through the contacts.

In view of the sudden temperature rise of the extension 2 when the water boils the decrease in magnetic attraction between the magnet 10 and extension 9 is sudden and marked, causing positive action and also meaning that extreme accuracy in assembly is not essential. The size of the magnet 10 also need not be large.

Figure 2:
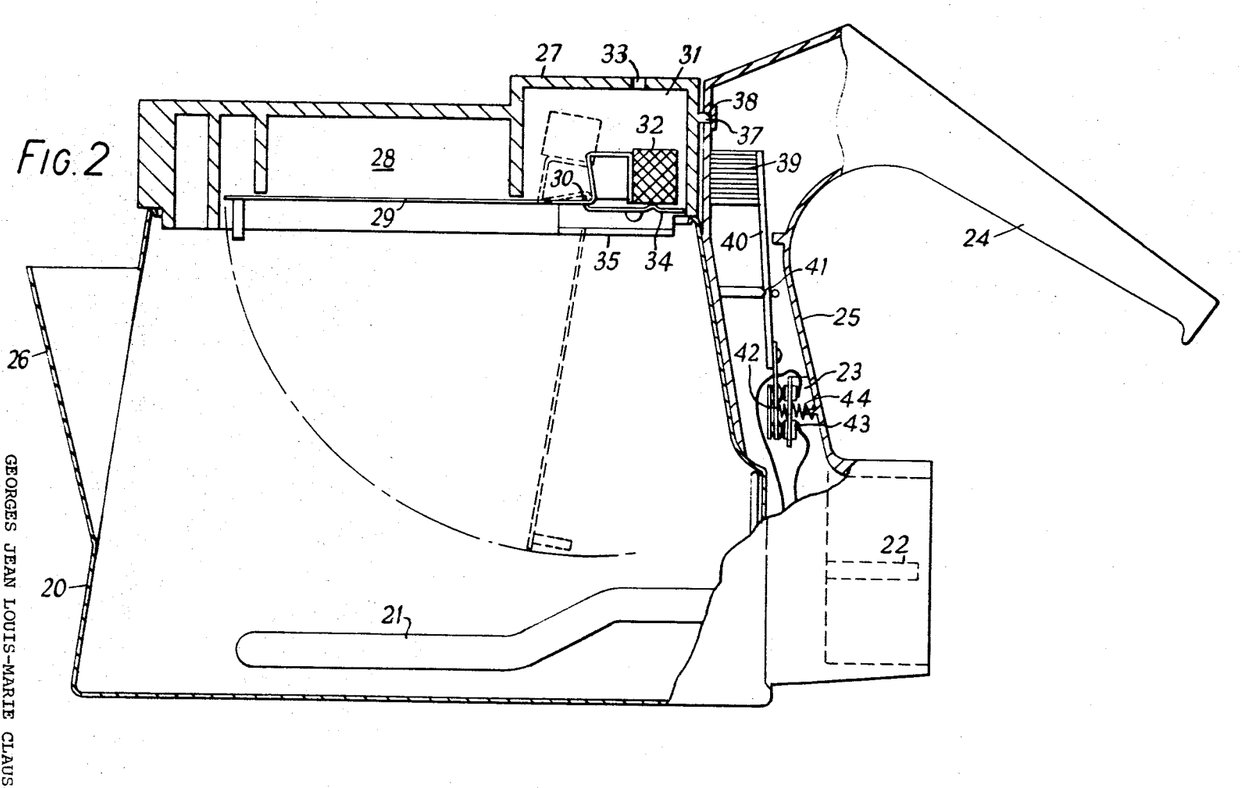
FIG. 2 is a sectional elevation and FIG. 3 a plan of a second form of beverage making apparatus.
Figure 3:
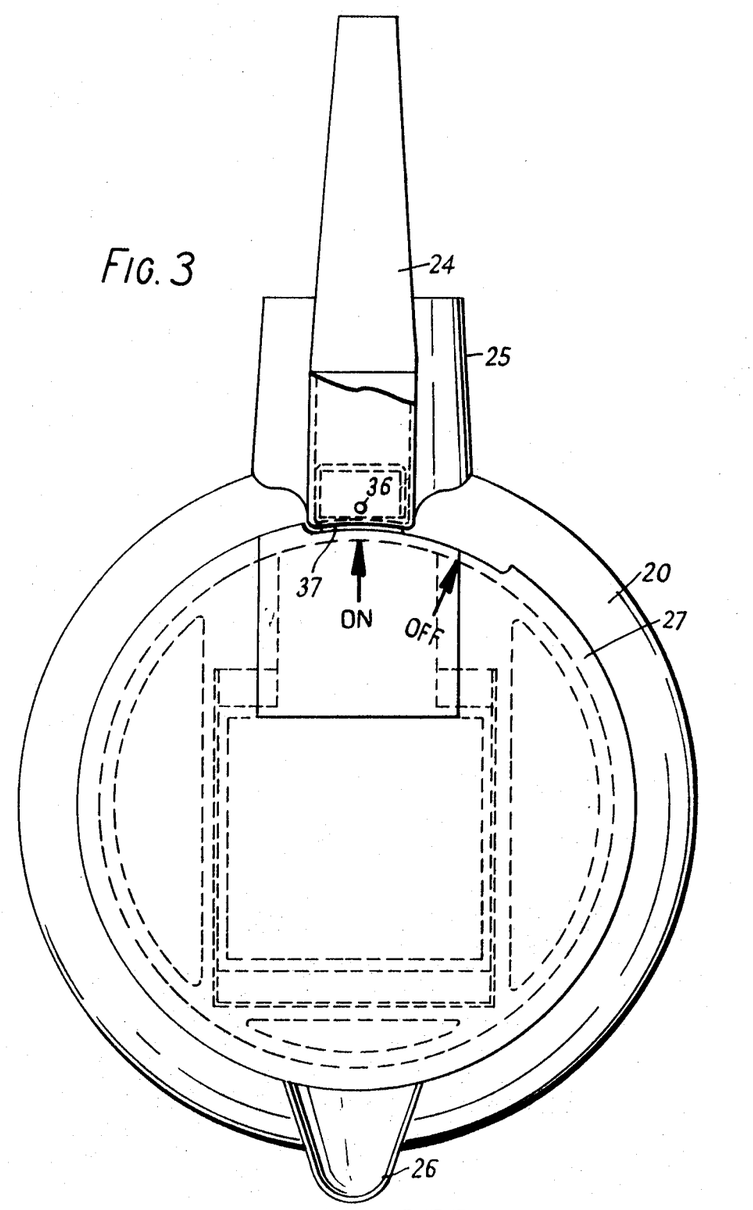

The beverage making apparatus shown in FIGS. 2 and 3 includes a water receptacle 20 in which there is a heating element 21 which is connected to electrical power input terminals 22 by leads and by contacts 23. The tea maker has a handle 24 which is molded integrally with a housing 25 on the outside of the water receptacle and extending between the handle 24 at the top of the receptacle 20 and the terminal socket. The water receptacle 20 has a spout 26.

A circular lid 27 includes a tea compartment 28 which is closed on its lower side by a flap 29 pivoted at 30. A compartment 31 also formed in the lid covers a magnet 32 which is fixed to the flap 29 on the side of the pivot 30 remote from the tea compartment 28. A vent 33 is formed in the roof of the compartment 31.

When the magnet is in the position shown in full lines with the tea compartment 28 closed by the flap 29, the magnet 32 rests against a plate 34 which is made of thermo-magnetic material having a Currie point slightly lower than the boiling point of water.

The attraction between the plate 34 and the magnet 32 is sufficient when the plate is below its Currie temperature to hold the flap 29 in a horizontal position under the weight of tea or tea bags within the tea compartment 28.

A screening plate 35 is positioned under the plate 34 in such a position as to substantially screen the plate from direct heat radiation from water in the receptacle and thus forms a heat-insulating air gap.

As can be seen in FIG. 3, the lid 27 is rotatable between a first position, being the one seen in FIGS. 2 and 3, in which a mark 36 on the top of the handle 24 is in line with an ON mark on the lid, and a second position, not shown, in which the mark 36 is in line with an OFF mark on the lid 27. When in the ON position, a tongue 37 on the lid engages in a groove 38 on the housing 25 thus prohibiting the removal of the lid when in this position. When in the OFF position, the lid may however be removed.

When the lid is in the ON position, as shown, the magnet 32 in the lid attracts a soft iron block 39 mounted on one end of an arm 40 pivoted at 41 in the housing 25. The other end of the arm 40 carries a contact bridge 42 which connects contact points 43 and thus completes the circuit through the contacts 23.

When the lid is turned to the OFF position, attraction between the magnet 32 and block 39 ceases, and by virtue of a spring 44 the arm 40 is biassed clockwise opening the contacts 23. Thus the contacts can only be closed when the lid is in the ON position.

In use, the lid 27 is turned to the OFF position and removed. With the lid inverted the tea compartment 28 is filled and the flap 29 moved to close the compartment 28 in which position it will remain due to attraction between the magnet 32 and plate 34. The water receptacle 20 is filled with water to a suitable level and the lid replaced.

The lid is then turned to the ON position, whereupon, as described abovem the magnet 32 attracts the block 39 and the contacts are closed causing electric current to flow through the heating element 21. It should be noted that the contacts will not be closed if the flap 29 should not be in its horizontal position. After a time the water boils and the plate 34, due to the screening plate 35, experiences a sudden temperature rise due to steam release which, due to the slight pressure thus created in the container, enters the compartment 31 in the lid and escapes through the vent 33. The attraction between the magnet 32 and the plate 34 then ceases, allowing the flap 29 to fall to the position shown in dashed lines in FIG. 2, whereupon the matter within the tea compartment 28 is dispensed into the boiling water.

Due to movement of the magnet 32, there is no longer an attractive force on the block 29, and the contacts 23 are opened by the spring 44, disconnecting the heating element 21 from the supply.

The block 39 may be replaced by another magnet or may form part of a reed switch. It will be appreciated that auxiliary contacts may be provided to operate a pilot light.

Figure 4:
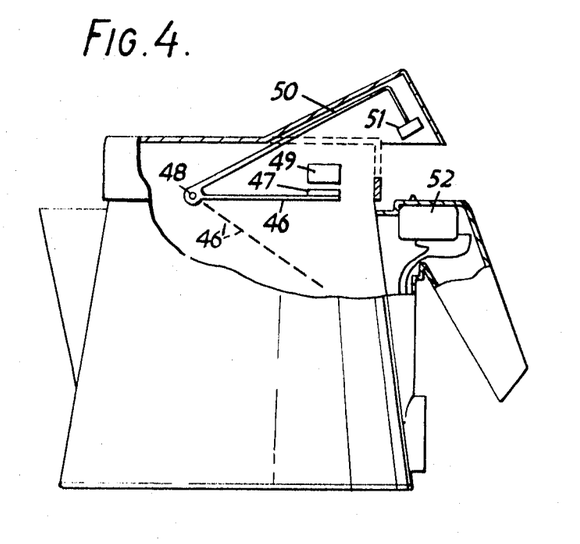
FIGS. 4 and 5 are diagrammatic sectional elevations of two further embodiments.

FIG. 4 shows a flap 46 carrying a body 47 formed of thermo-magnetic material at one end and pivoted about the other end 48. The body 47 is attracted by a magnet 49 so that the flap 46 remains in a horizontal position. When the body 47 heats up the attraction between it and the magnet 49 ceases and the flap is released to the position shown in dotted lines 46'. An arm 50 fixed to the flap 46 carries a weight 51 which descends when the flap is released and hits the switch 52 disconnecting the heating element from the supply.

Figure 5:
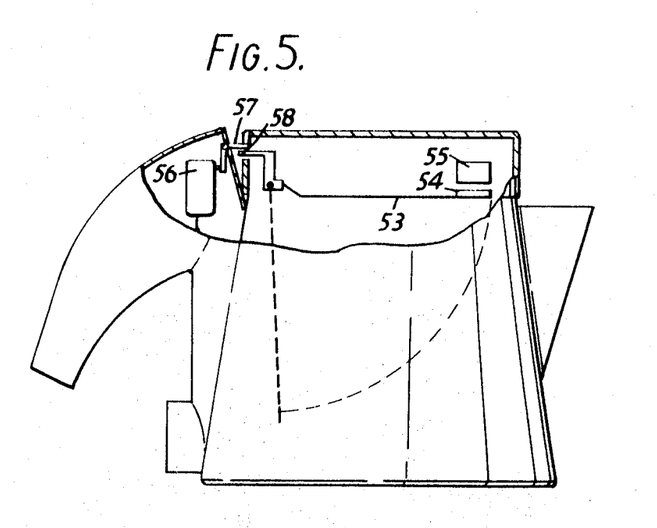

FIG. 5 illustrates a tea maker in which the flap 53 carrying the body 54 which is normally attracted by a magnet 55, is connected to trigger a switch 56 by means of a bellcrank 57. The switch is reset by an arm 58 connected with the flap engaging with the bellcrank as the lid is replaced on the device.

Figure 6:
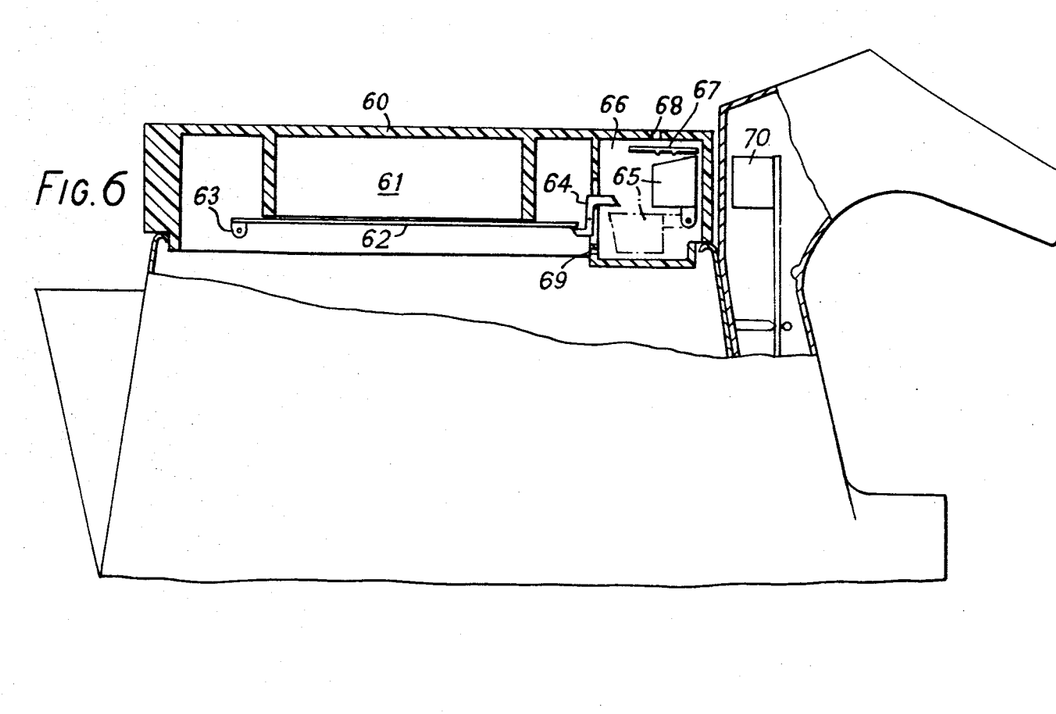
FIG. 6 illustrates part of a third form of beverage making apparatus.

FIG. 6 illustrates a modification of the tea maker of FIG. 2 in which the lid 60 includes a compartment 61 the lower surface of which is constituted by a flap 62 pivoted at 63. The flap is normally retained in the horizontal position shown by a resiliently biased latch 64.

A magnet 65 is pivotally mounted in a compartment 66 in the lid and is movable between position A shown in full lines and position B indicated in dashed lines. The magnet is retained in position A by attraction between itself and a plate 67 of thermo-magnetic material positioned near an exit vent 68 of the compartment 66. An inlet vent 69 is provided adjacent the latch 64.

When in position A the magnet further attracts a soft iron member 70 as in the tea maker of FIGS. 2 and 3. As as in the tea maker of FIGS. 2 and 3, the lid 60 is rotatable between an ON position and an OFF position.

When the tea compartment has been filled and the lid positioned so that current flows to the heating element, all as described with reference to FIG. 2, water in the container will be caused to boil. Due to the slight pressure thus created, steam enters the vent 69 and thus reaches the plate 67. When the plate reaches its Currie temperature, the magnet 65 is no longer attracted to it and rotates about its pivot point due to gravity. As it descends, the magnet 65 lifts one end of the latch member 64 which then rotates anticlockwise about its midpoint to release the flap 62. The rotation of the magnet 65 also opens the contacts as described with reference to FIG. 2.

When the lid is inverted to fill the tea compartment 61 the magnet 65 is automatically returned to position A in readiness for the next cycle.

The apparatus illustrated in FIG. 7 – 11, which is primarily intended for use in making tea, comprises a water receptacle 110 in the bottom of which there is an immersion heater, not shown, of conventional type. The receptacle has a spout 111 and a handle 112 formed of a suitable plastics.

Figure 7:
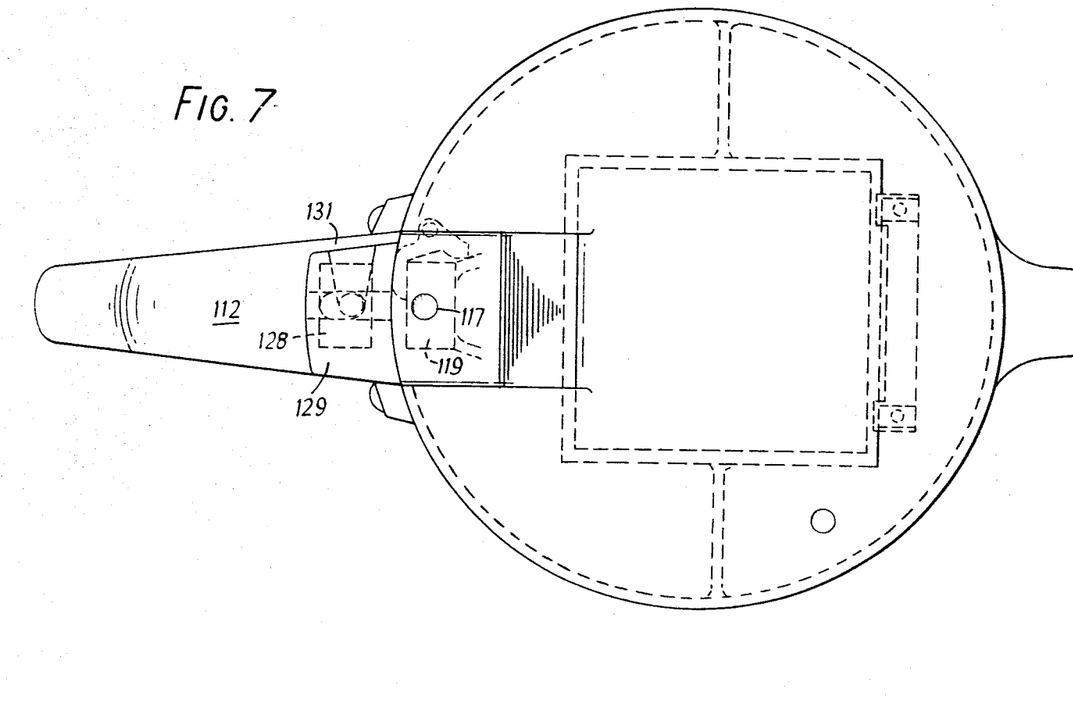
FIG. 7 is a plan view of a fourth form of a beverage making apparatus.
Figure 8:
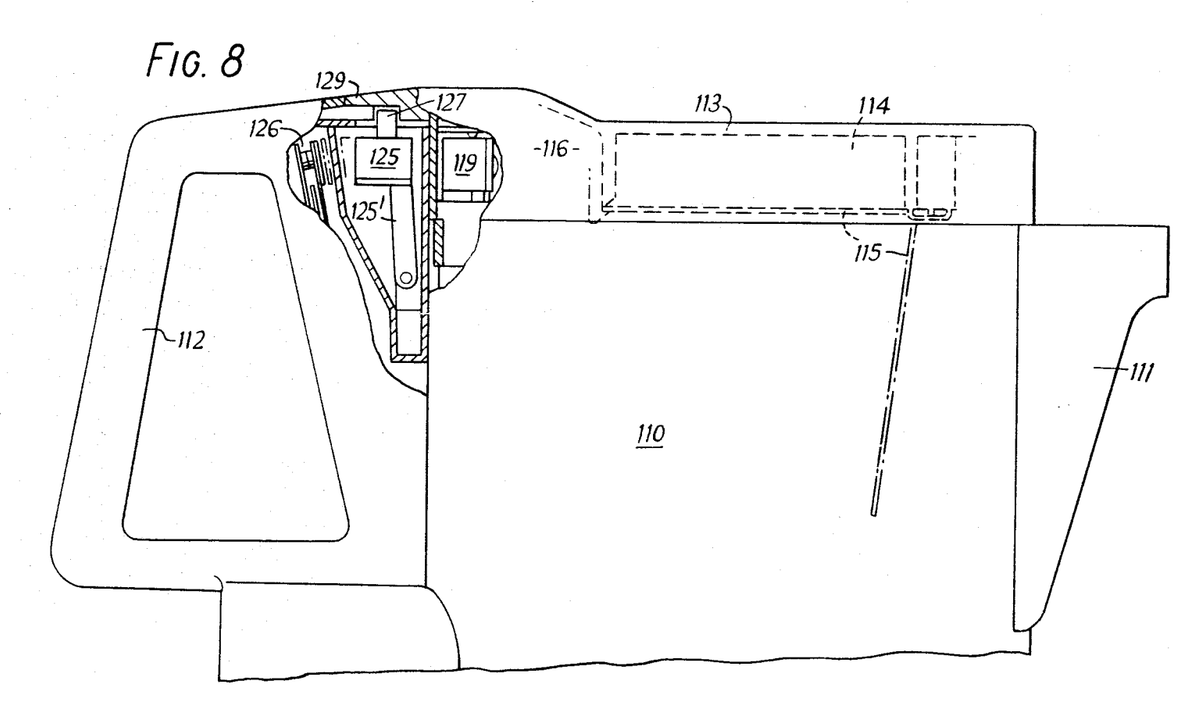
FIG. 8 is a side elevation partly in section.

The receptacle is closable by a lid 113, and the mouth of the receptacle and the mating surface of the lid are circular so that the lid may be rotated on the receptacle for a purpose to be described below.

Figure 10:
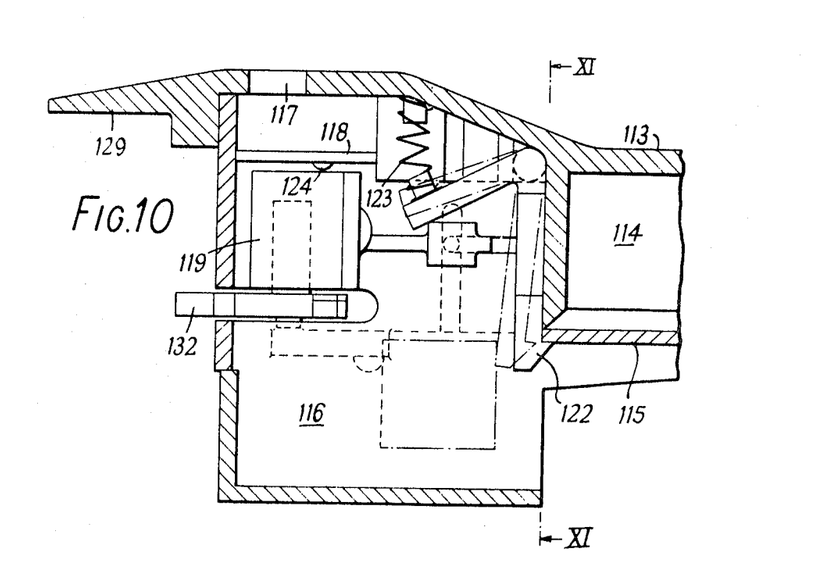
FIG. 10 is a vertical section on the line X — X in FIG. 9.

The lid 113 is formed on its underside with a compartment 114, for tea or other soluble or infusible matter, which is closable by a pivoted flap 115, and with a compartment 116 through which, when water in the receptacle boils, steam may flow to a vent 117.

Figure 11:
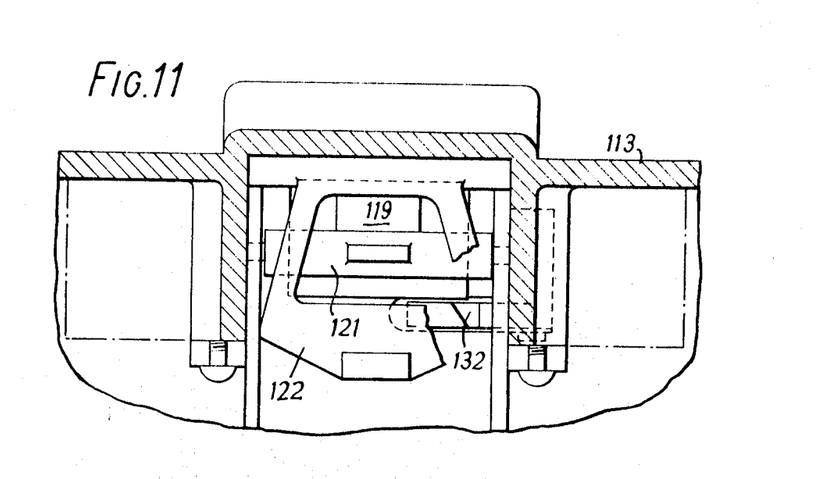
FIG. 11 is a vertical section on the line XI — XI in FIG. 10.

The compartment 116 houses a plate 18 of thermo-magnetic material, a magnet 119 carried by arms 120 extending from a spindle 121 journalled in the side walls of the compartment, and a spring biased latch 122 which normally acts to hold the flap 115 in closed position.

The magnet 119 is normally held in the position shown in full lines by magnetic attraction with the plate 118. When the water in the receptacle boils, steam passing into the compartment 116 and leaving through the vent 117 heats the plate to a temperature above its Currie point so that it becomes non-magnetic. The magnet 119 then drops away to the position shown in dotted lines and the rotation of spindle 121 causes a projection thereon to move the latch 122 against spring 123 so as to release the flap 115.

The plate 118 is formed with one or more projections 124 which serve to prevent direct face to face contact between the plate and magnet 119. This has two advantages. Firstly the small air gap so formed acts to compensate for changes in magnetic strength as may occur between different samples or as the result of aging and thus ensures reliable operation at the required temperature. Secondly, water present between the faces does not act to stick them together as may occur if face to face contact is permitted.

The handle 112 encloses a further magnet 125 which is carried on a pivoted arm 125' so that it is movable towards and away from the lid 113.

When the lid is in position on the receptacle and in the 'on' position the two magnets 119 and 125 are adjacent and the magnet 125 is held in the position shown in full lines by magnetic attraction. With the lid in any other position or removed from the receptacle the magnet 125 falls away, to the left in FIG. 8, and in this position it acts to separate a pair of contacts 126, the contact carrying spring adjacent the magnet being for this purpose formed from or provided with a piece of magnetic material.

The contacts 126 are included in the circuit of the immersion heater by connections, not shown, extending within the handle and a conventional neon indicator lamp may also be arranged in the handle.

Figure 9:
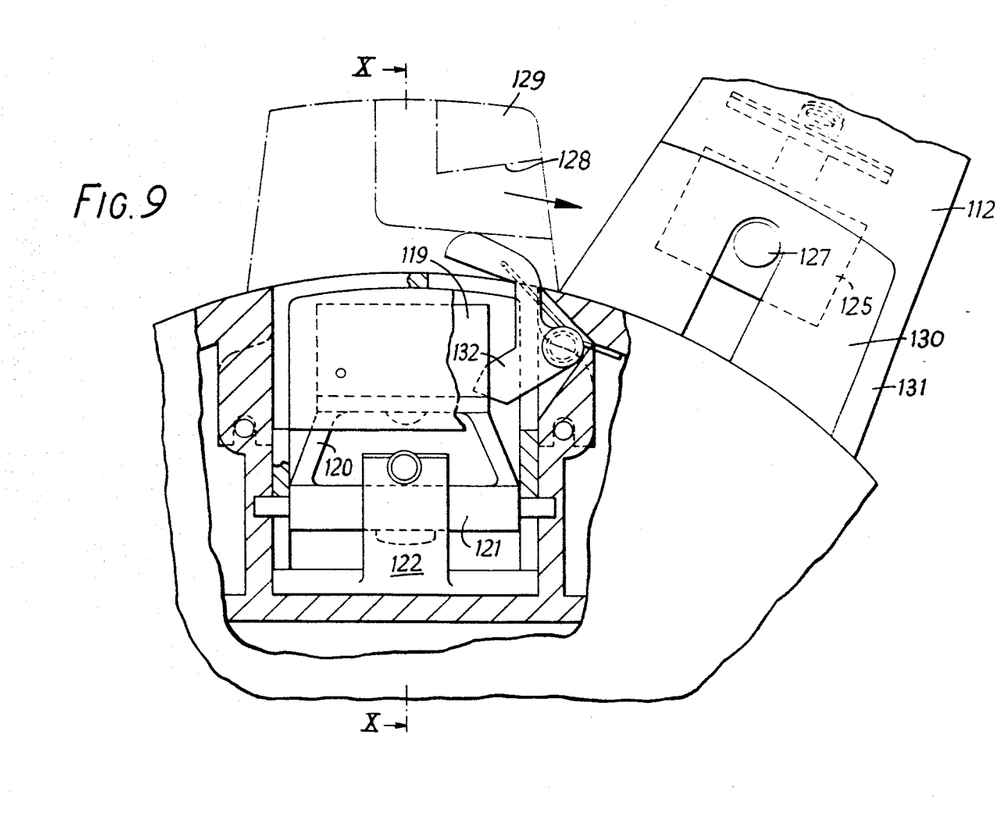
FIG. 9 is a fragmentary plan view partly in section and on a larger scale.

To ensure that the magnet 125 moves so that the contacts may close when the lid is in position the magnet is provided with a pin 127 that projects through a slot in the handle and is engaged by a cam surface 128 formed on the underside of a projecting part 129 on the lid. As shown, this part 129 is received and housed in a recess 130 formed in the handle and provided with a wall 131 which prevents further movement of the lid in a clockwise direction.

Accordingly when the lid is in position on the receptacle and rotated clockwise, for example from the position shown in FIG. 9 to the position shown in FIGS. 7 and 8, the pin 127 will be engaged by the cam surface 128 and will be moved towards the lid so as positively to bring the magnet 125 into position where it will be held in place by magnetic attraction with magnet 119. The contacts 126 will then be able to close.

This rotation of the lid also acts to move a latch 132 which projects through an aperture in the lid and is engaged by the inside surface of the handle. This latch is provided so as to prevent magnet 119 falling away from plate 118 and thus releasing the flap when the lid is being handled, and it is moved out of its operative position when the lid is rotated to the "ON" position.

In use the lid 113 is removed from the receptacle 110 and while in inverted position the compartment 114 is filled with tea. In this position of the lid the magnet 119 will fall down onto the plate 118 and will be retained in this position by magnetic attraction and by the latch 132. The flap 115 is now closed and is held in this position by the latch 122. The receptacle is now filled with the required amount of water and the lid placed thereon.

When it is desired to commence operations the lid is rotated clockwise to the "ON" position when further movement is prevented by the engagement of projecting part 129 of the lid with the wall 131 on the handle. In this position of the lid the magnet 125 has been moved forward and is held by magnetic attraction with the magnet 119, the contacts 126 can now close and the latch 132 has now been moved from below the magnet 119.

When the water in the receptacle boils the steam heats the plate 118 and when this becomes non-magnetic the magnet 119 will fall. This on the one hand moves the latch 122 to allow the flap 115 to fall to release the tea into the water, and on the other hand releases the magnet 125 which moves away from the lid and acts to open the contacts 126 thereby opening the circuit of the immersion heater.

From the foregoing it will be appreciated that provided the user fills the lid with tea, the receptacle with water, applies the lid to the receptacle and turns it to the "ON" position there is nothing else to do and the setting up of the magnets and circuit will be effected entirely automatically. The whole operation requires a minimum of attention on the part of the user and is as "foolproof" as possible.

In a simplified arrangement which however does require a little more care on the part of the user the magnet 125 may be omitted and the contacts 126 closed by the operation of a push button which may be latched on by co-operation with the magnet 119 when it is in its raised position.

In the case where the apparatus does not have immersion heater and has to be heated on a hot plate or over a fire the lid may be constructed as described but all the parts in the handle may be omitted.

The improved apparatus shown in FIGS. 7 – 11 lends itself to a very simple arrangement for providing a time control. For this purpose there is provided a base which will hold the receptacle in fixed spaced relation to a clock of the kind in which at a preset time an arm extending from the side of the clock will move downwards. This arm or an extension thereof is position so as to engage a cam surface formed on the side of the lid such that when the arm moves the lid will be turned through a small angle into the "ON" position. The required angle is approximately that shown in FIG. 9 between the projecting part 129 of the lid and the handle 112 and such degree of movement is very easily effected by the arrangement described above.

In use of the various beverage making apparatus described above it has been found that as the water is heated and as it boils a circulating system is set up in which the water rises in the center part of the receptacle and falls round the side. This results in a tendency for tea leaves, coffee grounds or other infusible matter to congregate round the side of the receptacle at or above the water level with the result that satisfactory infusion does not occur and that the outlet and/or temperature sensitive control apparatus operated by steam may become choked up.

These disadvantages may be overcome by arranging within the lower part of the receptacle a baffle member of inverted dish-like form.

In the case where an immersion heater is used such baffle member may extend over and cover, as seen from above, the immersion heater.

Such arrangement prevents the setting up of the above described circulating system of water and can be arranged to produce circulation in the opposite direction, that is upwards at the side and downwards in the middle, with considerable benefit as regards infusion. It has however a further important advantage where control equipment is provided which includes a temperature sensitive element responsive to the temperature of the steam produced when the water boils. As the water boils steam or air is trapped beneath the inverted dish-like baffle and owing to the slight increase of pressure in this region has a temperature somewhat above the boiling point of water. In due course the trapped steam will overflow and rise to the surface producing a sudden increase of temperature in the space above the water in the receptacle. By exposing the temperature sensitive element to the steam a rapid and precise response can be obtained as the water boils.

Figure 12:
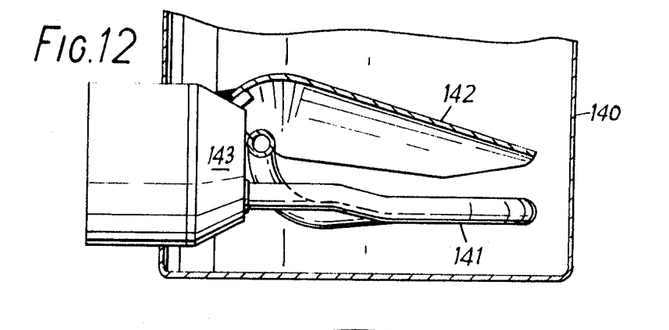
FIGS. 12 and 13 are a sectional side view and a plan view respectively of part of a receptacle having an immersion heater; and, FIG. 14 is a sectional side view of part of a receptacle having a perforated inner container.
Figure 13:
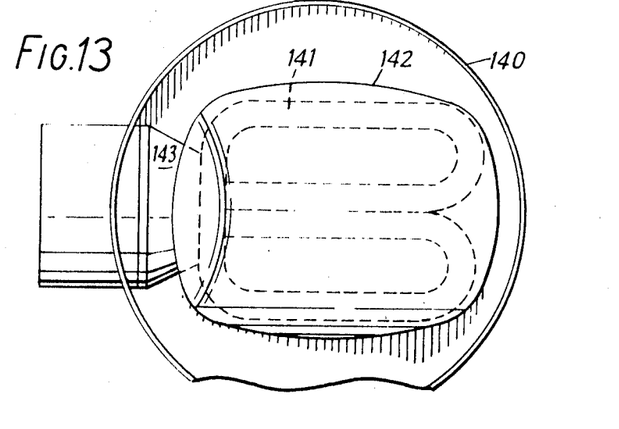
Figure 14:
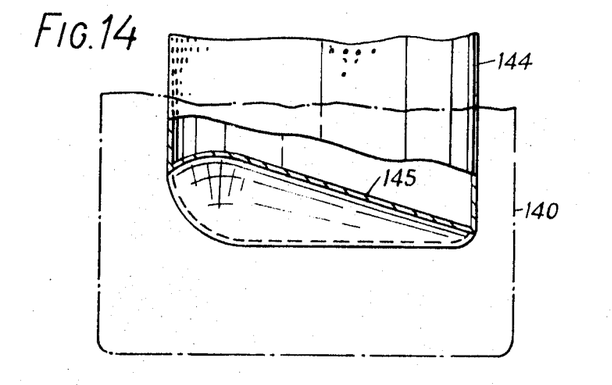

One form of this arrangement is shown in FIGS. 12 and 13 in which a receptacle 140 has arranged therein an immersion heater 141 of conventional type. Arranged above the heater is a baffle member 142 formed of sheet metal which is shaped, in dish-like form, so that its edges are lower than its center. Conveniently the baffle member is secured at one edge to the boss 143 of the immersion heater. Its precise shape is not important so long as it acts to trap steam rising from the heater but it is convenient to position the highest point adjacent one side of the receptacle and below the position a temperature sensitive control element may occupy.

Where the receptacle is provided with an inner perforated container 144 into which tea or other matter to be infused is dispensed the base 145 of such container may be formed, as shown in FIG. 14, in the shape of the baffle 142 of FIG. 12 and 13 and arranged just above an immersion heater, not shown. The effect is the same as described above. Preferably when using such a perforated container the perforations are graded in size, the perforations being larger near the top and smaller near the base.

What is claimed is:

1. Beverage making apparatus comprising a liquid receptacle, means normally positioned to support soluble or infusible matter above liquid in the receptacle, and means for releasing the support means whereby to dispense the matter into the liquid, the release means including a magnet and a body of thermo-magnetic material which normally are held together by magnetic attraction and which, when the temperature of the body exceeds a predetermined value, separate from one another whereby to release the support means.

2. Beverage making apparatus as claimed in claim 1 wherein the receptacle includes a removable lid formed on its underside with a compartment for the soluble or infusible matter and the support means comprises a hinged flap which normally closes the compartment and which when released drops to dispense the matter into the receptacle.

3. Beverage making apparatus as claimed in claim 2 wherein the magnet is supported in the lid and the body of thermo-magnetic material is mounted as a part of the flap remote from the hinge.

4. Beverage making apparatus as claimed in claim 3 and including electric heating means wherein the dropping of the flap is effective to open contacts included in the circuit of the heating means.

5. Beverage making apparatus as claimed in claim 3 and including electric heating means wherein the magnet is supported in the lid for movement between two positions, in the first of which it is held by magnetic attraction with the body of thermo-magnetic material when the flap is closed, and moves to the second position, when the flap is released, wherein it attracts a ferromagnetic member connected with contacts in the circuit of the heating means and arranged when attracted to the magnet to open these contacts.

6. Beverage making apparatus as claimed in claim 5 wherein movement of the magnet is effected by spring means.

7. Beverage making apparatus as claimed in claim 5 wherein movement of the magnet is effected by gravity.

8. Beverage making apparatus as claimed in claim 3 wherein the body of thermo-magnetic material is screened from heat radiated from the liquid in the receptacle.

9. Beverage making apparatus as claimed in claim 8 in which the body is mounted in a compartment in the lid of the receptacle which has an opening for steam from the receptacle and a vent to the exterior.

10. Beverage making apparatus as claimed in claim 2 wherein the body of thermo-magnetic material is mounted on the lid and the magnet is mounted on the flap.

11. Beverage making apparatus as claimed in claim 10 and including electric heating means wherein the magnet is positioned when the flap is closed also to attract a ferro-magnetic member connected with contact in the circuit of the heating means and arranged when so attracted to close these contacts.

12. Beverage making apparatus as claimed in claim 2 wherein the flap is held in closed position by means of a catch, the body of thermo-magnetic material is fixed to the lid, and the magnet is movably mounted in the lid and so arranged that when it separates from the body it moves the catch to release the flap.

13. Beverage making apparatus as claimed in claim 12 and including electric heating means wherein the movement of the magnet is also effective to open contacts in the circuit of the heating means.

14. Beverage making apparatus as claimed in claim 13 wherein the magnet is pivotally mounted for movement about an axis spaced from the magnet, the magnet normally being held in a raised position by attraction to the body of thermo-magnetic material and when separating therefrom falling downwards and laterally under the influence of gravity.

15. Beverage making apparatus as claimed in claim 14 including a ferro-magnetic member mounted for movement between two positions in the first of which the contacts are held closed and in the second of which the contacts are held open, the ferro-magnetic member being positioned such that it is held in its first position by magnetic attraction to the magnet when in its raised position.

16. Beverage making apparatus as claimed in claim 15 wherein the ferro-magnetic member is connected with the contact.

17. Beverage making apparatus as claimed in claim 15 wherein the ferro-magnetic member is a second magnet which when in the second position attracts a ferro-magnetic member connected with the contact whereby to open them.

18. Beverage making apparatus as claimed in claim 15, wherein the lid is rotatable on the receptacle, the magnet is mounted adjacent the periphery of the lid and the ferro-magnetic member is mounted on the wall of the receptacle whereby rotation of the lid to an 'ON' position in which the magnet and member are adjacent causes the contact to close.

19. Beverage making apparatus as claimed in claim 18 including cam means on the lid for engaging the member to move it into the field of attraction of the magnet when the lid is in the 'ON' position.

20. Beverage making apparatus as claimed in claim 18 including latch means for holding the magnet in its raised position and which are moved when the lid is in its 'ON' position to free the magnet.

21. Beverage making apparatus as claimed in claim 1 wherein a baffle member of inverted dish-like form is mounted in the lower part of the receptacle.

22. Beverage making apparatus as claimed in claim 21 and in which the receptacle includes an electric immersion heater wherein the baffle member is mounted on and above the immersion heater.

23. Beverage making apparatus as claimed in claim 1 and in which the receptacle includes an inner perforated container wherein the base of the container is shaped in inverted dish-like form.

* * * * *